W. W. HARRIS.
PLANTER.
APPLICATION FILED NOV. 25, 1912.
1,127,238.
Patented Feb. 2, 1915.
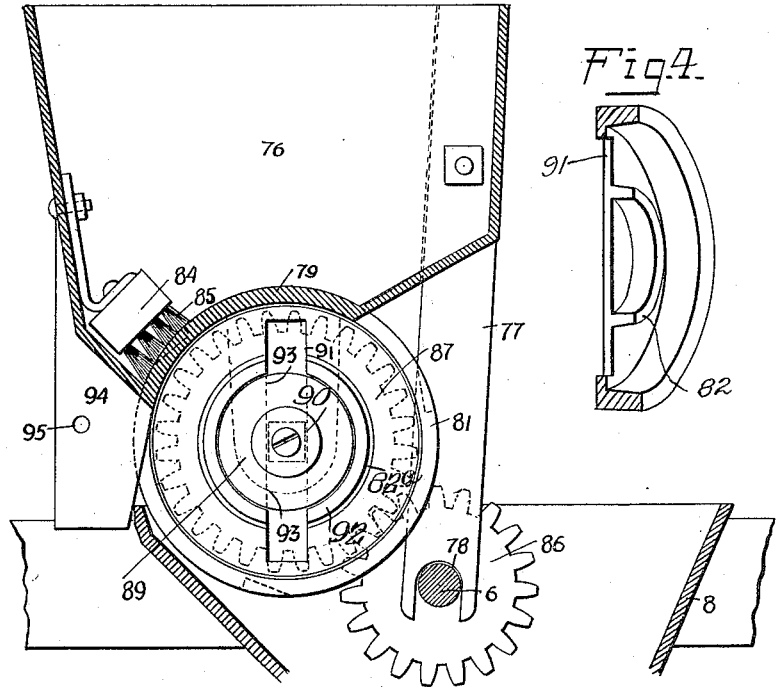
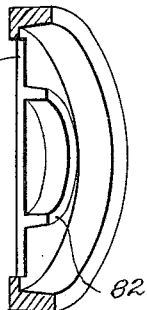
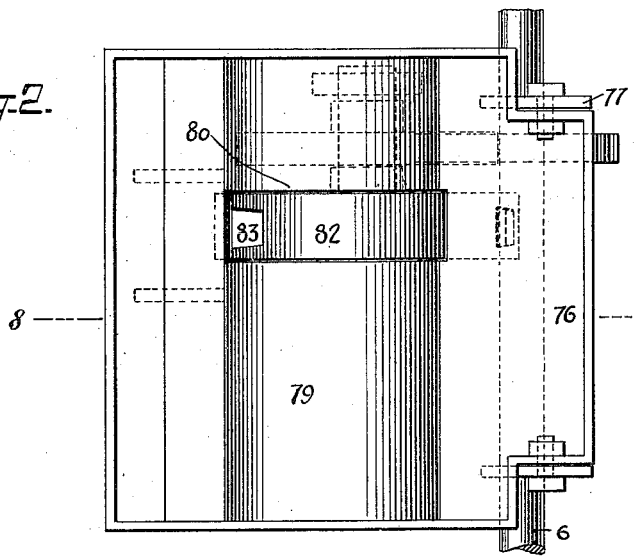
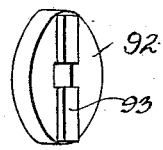
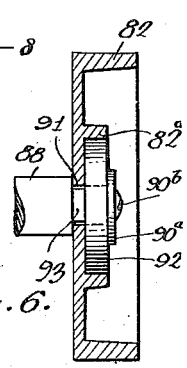
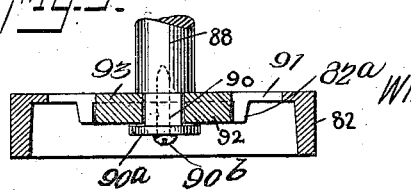
WITNESSES
INVENTOR
WILLIAM W. HARRIS,
BY
ATTORNEYS
THE NORRIS PETERS CO., PHOTO-LITHO., WASHINGTON, D. C.

UNITED STATES PATENT OFFICE.

WILLIAM W. HARRIS, OF SPARTANBURG, SOUTH CAROLINA.

PLANTER.

1,127,238.

Specification of Letters Patent. Patented Feb. 2, 1915.

Application filed November 25, 1912. Serial No. 733,354.

*To all whom it may concern:*

Be it known that I, WILLIAM W. HARRIS, a citizen of the United States, and a resident of Spartanburg, in the county of Spartanburg and State of South Carolina, have invented a new and Improved Planter, of which the following is a full, clear, and exact description.

My invention has for its object to provide a planter with means for mounting a seed distributing wheel in a slot in the bottom of a hopper member so that the seed distributing wheel may be quickly removed.

The planter is provided with a hopper having a curved bottom with a slot through which the periphery of a seed distributing wheel is disposed, the seed distributing wheel being secured to a shaft by which it is rotated by a key which has an angular opening in which fits an angular end of the shaft which projects through a slot in the seed distributing wheel, the key having projections engaging the seed distributing wheel at the slot and being held in position by a flange on the seed distributing wheel. The seed distributing wheel may quickly be removed, so that another seed distributing wheel of a slightly different shape or with a number of additional seed pockets, may be substituted, it being possible to remove the periphery of the seed distributing wheel from within the slot in the hopper by permitting the angular end of the shaft to move upward in the slot in the seed distributing wheel until the periphery of the seed distributing wheel is freed from the bottom of the hopper.

Still other objects of the invention will appear in the following complete specification, in which the preferred form of the invention is disclosed.

In the drawings similar characters of reference indicate corresponding parts in all the views, in which—

Figure 1 is a sectional view on the line 8—8 of Fig. 2; Fig. 2 is a plan view of Fig. 1; Fig. 3 is a sectional fragmentary view, showing the means for mounting the seed distributing drum, shown in Figs. 1 and 2. Fig. 4 is a perspective view in sections showing the seed distributing wheel; Fig. 5 is a perspective view of the key; and Fig. 6 is a transverse sectional view of Fig. 3.

I provide a hopper member 76, having supporting members 77, with bearings 78, for engaging the axle 6. The bottom of this hopper member 76 is curved at 79, and it has an opening 80 therein, in which the periphery 81 of the seed distributing wheel 82 is adapted to move. There are pockets 83 in this seed distributing wheel 82, so that when it rotates, the seed in the hopper member 76 may fall into these pockets, and with the rotation of the seed distributing wheel 82, the seed contained in these pockets 83 will be deposited in the furrow. The planter may be supplied with several of these seed distributing wheels 82, each with pockets disposed at the desired distances apart, and of a predetermined size, so that the desired amount of seed may be deposited in the furrow at predetermined intervals. However, if desired, the pockets 83 may be filled up with plaster of Paris, or similar material, so that they will serve to hold only a predetermined amount of seed.

Within the hopper member 76 there is a brush 84, the bristles 85 of which engage that portion of the periphery of the seed distributing wheel 82 as it leaves the opening 80 in the curved bottom 79 of the hopper member 76. It will therefore be seen that the bristles 85 will prevent the seed from being carried from the hopper member 76 except in the pockets 83.

The seed distributing wheel 82 is operated in the following manner: To the axle 6 there is secured a gear wheel 86, which meshes with the gear wheel 87, secured to a shaft 88, journaled in bearings in the depending lugs 89, secured to the hopper member 76. The end 90 of the shaft 88 is angular, and is disposed in the slot 91 in the seed distributing wheel 82. There is also mounted on this square end 90 of the shaft 88, a key 92, which fits snugly the end 90 of the shaft 88, to rotate with the said shaft, this key 92 also having extending portions 93, which are disposed in the ends of the slot 91. The key 92 is held centrally by the angular flange 82$^a$ on the seed distributing wheel 82. The key 92 is held to the end of the shaft 88 by a washer 90$^a$ and a screw 90$^b$. It will therefore be seen that the key 92 will be rotated by the shaft 88, and that by means of the extending portions 93 the key 92 will rotate the seed distributing wheel 82. The hopper member 76 is provided with a depending portion 94, with an orifice 95, in which may be secured, if desired, a seed spout, for conveying seed from the pockets 83 in the seed distributing wheel, to the bottom of the furrow. When the key 92 is removed from the end 90 of the shaft 88 the feed wheel or drum 82 can be slipped down from within the opening 80 to allow the wheel 82 to be taken out and permit the substitution of another wheel 82 with different pockets 83. The square end 90 of the shaft 88 extends very slightly beyond the key 92 so that the washer 90ᵃ cannot bind the square end 90 of the shaft to the key 92. This method of fastening allows the seed distributing wheel 82 a certain amount of play to adapt itself to irregularities in the casting. Ordinarily rough but good casting will answer and it is unnecessary to work any other parts on a lathe in constructing the device.

Having thus described my invention, I claim as new, and desire to secure by Letters Patent:—

1. In a planter, a seed hopper having an opening, a feed wheel having a slot in its side and a periphery extending in the opening and provided with a pocket for receiving the seed, a shaft having an angular portion disposed in the slot, and means for holding the feed wheel on the angular portion of the shaft.

2. A seed feeding wheel having a slot, a shaft having an angular portion disposed in the slot, a key piece having an angular opening engaging the angular portion of the shaft, and a member disposed in the slot in the wheel.

3. In a planter, a hopper member having a bearing and an opening, a shaft journaled in the bearing and having an angular portion, a seed distributing wheel having a pocket in its periphery the seed distributing wheel being disposed with its periphery in position for rotating in the opening in the hopper member, there being a slot in the seed distributing wheel in which the angular portion of the shaft is normally disposed, the slot permitting the movement of the seed distributing wheel out of the opening in the hopper member, a key having an opening fitting the angular portion of the shaft, and extending portions fitting the slot above and below the angular portion of the shaft for holding the seed distributing wheel in normal position.

4. In a planter, a seed hopper having an opening, a feed wheel having a slot in its side and a periphery extending in the opening, and provided with pockets for feeding the seed, a shaft having an angular portion disposed in the slot, and means for holding the feed wheel loosely on the angular portion of the shaft.

5. In a planter, a hopper member having a bearing and an opening, a shaft journaled in the bearing and having an angular portion, a seed distributing wheel having a pocket in its periphery, the seed distributing wheel being disposed with its periphery in position for rotating in the opening of the hopper, there being a slot in the seed distributing wheel in which the angular portion of the shaft is normally disposed, the slot permitting the movement of the seed distributing wheel out of the opening in the hopper member, a circular key having an opening fitting the angular portion of the shaft and extending portions fitting the slot and a circular flange on the seed distributing wheel for holding the key in a normal position.

In testimony whereof I have signed my name to this specification in the presence of two subscribing witnesses.

WILLIAM W. HARRIS.

Witnesses:
J. K. STUCKEY,
JESSE W. BOYD.

Copies of this patent may be obtained for five cents each, by addressing the "Commissioner of Patents, Washington, D. C."